United States Patent [19]

Kojima et al.

[11] Patent Number: 4,749,016
[45] Date of Patent: Jun. 7, 1988

[54] RADIAL TIRE HAVING AN IMPROVING DURABILITY

[75] Inventors: Koichi Kojima, Higashimurayama; Munetoshi Shimotake, Kodaira; Tamio Araki, Fuchu, all of Japan

[73] Assignee: Bridgestone Corporation, Tokyo, Japan

[21] Appl. No.: 903,870

[22] Filed: Sep. 2, 1986

Related U.S. Application Data

[63] Continuation of Ser. No. 657,659, Oct. 4, 1984, abandoned, which is a continuation-in-part of Ser. No. 517,306, Jul. 26, 1983, abandoned.

[30] Foreign Application Priority Data

Aug. 10, 1982 [JP] Japan .............................. 57-137905
Aug. 4, 1983 [DE] Fed. Rep. of Germany ....... 3328202

[51] Int. Cl.$^4$ .................................................. B60C 9/26
[52] U.S. Cl. ................................. 152/527; 57/902; 152/528
[58] Field of Search .............. 152/451, 527, 528, 530, 152/556; 57/9, 13, 212, 218, 236, 902

[56] References Cited

U.S. PATENT DOCUMENTS

| | | | |
|---|---|---|---|
| 2,492,352 | 12/1949 | Bourdon | 57/218 |
| 2,567,300 | 9/1951 | Riddle | 57/218 |
| 3,762,145 | 10/1973 | Kikuchi et al. | 57/218 |
| 3,911,662 | 10/1975 | Fenner | 152/359 |
| 3,922,841 | 12/1975 | Katsumata et al. | 57/218 |
| 4,077,454 | 3/1978 | Miyoshi et al. | 152/361 R |
| 4,158,946 | 6/1979 | Bourgois | 152/359 |
| 4,197,894 | 4/1980 | Boileau | 152/361 FP |
| 4,268,573 | 5/1981 | Baillievier | 57/218 |

FOREIGN PATENT DOCUMENTS 2307327  8/1974  Fed. Rep. of Germany ...... 152/361 FP Primary Examiner—Donald E. Czaja
Assistant Examiner—Ramon R. Hoch
Attorney, Agent, or Firm—Sughrue, Mion, Zinn, Macpeak & Seas

[57] ABSTRACT

A radial tire having excellent cornering stability and high-speed durability is disclosed. The tire has a belt composed of a first structural body, which consists of a single rubberized cord layer containing cords of twisted metal wires and is folded at both lengthwise end portions, and a second structural body consisting of at least one rubberized cord layer containing unextensible cords, wherein the cord of twisted metal wires used in the first structural body has a specifically limited twisting construction and a specifically limited elongation.

3 Claims, 4 Drawing Sheets

FIG_1
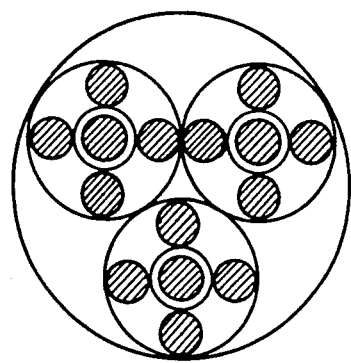
FIG_2
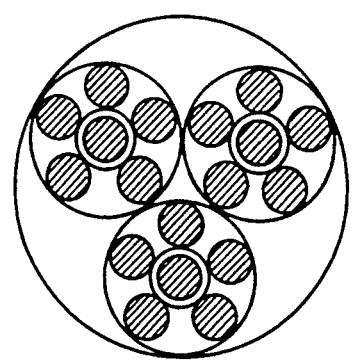
FIG_3
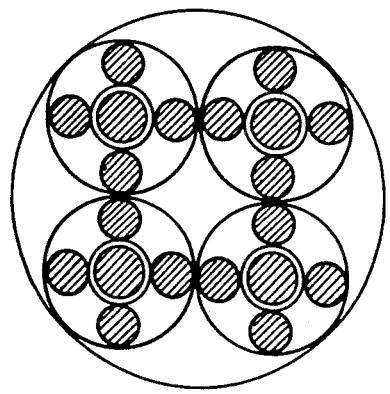
FIG_4
PRIOR ART
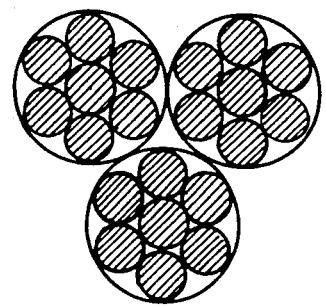

RADIAL TIRE HAVING AN IMPROVING DURABILITY

CROSS-REFERENCE TO RELATED APPLICATION

This is a continuation of Ser. No. 657,659, filed on Oct. 4, 1984, now abandoned, that is a continuation-in-part application of application Ser. No. 517,306 filed July 26, 1983 now abandoned.

BACKGROUND OF THE INVENTION (1) Field of the Invention

The present invention relates to a radial tire having an improved durability, and particularly relates to an improvement in a radial tire provided with a belt having a folded portion of metal cords.

(2) Description of the Prior Art

In the belt of radial tire, unextendable metal cord, particularly steel cord, is preferably used as a reinforcing material, and belts having the following structures are known; a structure wherein a plurality of rubberized cord layers, each containing cords arranged at a small inclination angle of 5°-25° with respect to the equatorial plane of the tire, are merely superposed such that the cords arranged in adjacent layers are crossed with each other; and a so-called fold structure, wherein one of adjacent two layers of a plurality of layers is folded at the end portions in the width direction, and the folded layer and a layer which is not folded are superposed in various arrangements, or both the adjacent layers are folded at the end portion in the width direction, and are superposed with each other.

The fold structure in a belt is higher in the rigidity in the circumferential direction than a structure wherein cord layers are merely superposed with each other, due to the fold effect of the cord layer. Therefore, the tire having the fold structure ought to be excellent in the cornering stability and in the high-speed durability. However, in the tire, the inclination angle of the cord with respect to the equatorial plane is small, and therefore extremely high tension acts locally on the cords located at the bent corner formed by the folding of the cord layer, and the cords are apt to break not only by an action of external force during the running, but also even by an internal pressure applied to the tire during the vulcanization of the tire. Therefore, a satisfactory improvement of durability of tire has not yet been attained.

There have been proposed the following methods as a means for solving the above described drawbacks.

1. A method disclosed in Japanese Patent Laid-Open Application No. 65,602/73, wherein a cord layer is folded in a direction, which decreases the twist of cords, to decrease the excess torsion in the folded portion.

2. A method disclosed in Japanese Patent Laid-Open Application No. 44,902/74, wherein one or more of auxiliary layers are inserted into the inside of the folded portion to form a large radius R of curvature in the folded portion, whereby the bending strain is decreased. However, in the above described method (1), the bending strain cannot be decreased; and in the method (2), the bending strain can be decreased, but the thickness of the belt layer becomes very large, and therefore the resulting tire is poor in the resistance against heat built-up and in the high-speed durability.

SUMMARY OF THE INVENTION

The present invention provides a radial tire having an improved durability by the use of a belt, which has advantageously solved the drawbacks of the breakage of cord due to folding of cord layer without being formed into a large thickness.

The feature of the present invention lies in a radial tire having an improved durability, comprising a carcass composed of at least one rubberized cord ply, and a belt superimposed about a crown portion of the carcass and composed of a first structural body and a second structural body; said first structural body consisting of a single rubberized cord layer containing cords of twisted metal wires arranged at an inclination angle of 5°-25° with respect to the equatorial plane of the tire and embedded in a coating rubber; said second structural body consisting of at least one rubberized cord layer containing unextendable cords arranged at a certain inclination angle with respect to the above described equatorial plane in a direction of crossing with the cords in a base portion of the first structural body and embedded in a coating rubber; and at least the first structural body being folded at the widthwise end(s) such that the folded portion(s) are superposed on the base portion of the structural body; an improvement comprising the cord of twisted metal wires used in the structural body, which has the folded portion(s) at the widthwise end(s), having a twisting construction represented by the following commonly used formula (1):

$$n \times (1+m) \times \phi \tag{1}$$

wherein m is the number of metal wires in a strand surrounding a core, n is the number of strands used, and $\phi$ is a diameter of the metal wire, which satisfies a relation represented by the following formula (2)

$$m = -\frac{1}{2}n^2 + 3n \pm \left(2 - \frac{n}{2}\right) \tag{2}$$

where: $\{n \mid n=3,4\}$ that is, having a twisting construction of $3\times(1+4)\times\phi$, $3\times(1+5)\times\phi$ or $4\times(1+4)\times\phi$ (wherein $\phi$ is not less than 0.15 mm but is not more than 0.23 mm); and the cord consisting of a plural number of strands twisted together, each strand consisting of previously spirally curved metal wires twisted together, the twisting direction of the cord being the same as that of the strands; and further the elongation of the cord under a load of 5 kg/cord being 0.3–2.5% at such a state that the coating rubber is not penetrated into the cord, and being not more than 0.7% after the vulcanization of the tire.

BRIEF DESCRIPTION OF THE DRAWINGS

FIGS. 1–3 are cross-sectional views of cords of twisted metal wires used in a belt according to the present invention;

FIGS. 4–6 are cross-sectional views of comparative cords;

DESCRIPTION OF THE PREFERRED EMBODIMENT

Figure 5:
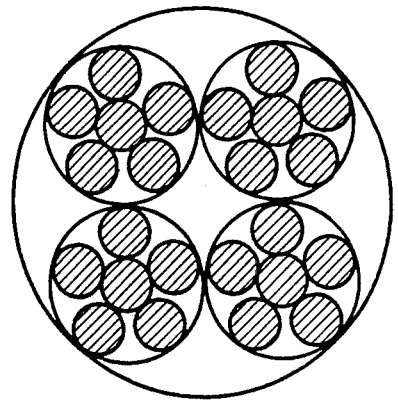

The term "state that the coating rubber is not penetrated into the cord" used in the present invention means a cord in a green state, wherein a cord has not yet been coated with a coating rubber, or a cord after a treatment, wherein a cord is taken out from a vulcanized tire and the coating rubber adhered to the cord is decomposed by chemicals and removed from the cord. Further, the fact that a cord has an elongation of not more than 0.7% after vulcanization of a tire, can be ascertained by a method, wherein a cord is taken out from a vulcanized tire, and the elongation of the cord is measured under a load of 5 kg/cord and under such a state that the cord is coated with the coating rubber and the coating rubber is penetrated into the vacant space in the cord.

The cord having the above described elongation of the present invention can be produced in the following manner. That is, an excessively curved spiral has previously been formed in a metal wire, for example, a steel wire, having a diameter $\phi$ of 0.15-0.23 mm, a plural number of the metal wires are twisted together into a strand, and further a plural number of the strands are twisted together into a cord in the same twisting direction as that of the strands. In this twisting, the twisting pitch of metal wires is preferably 2-8 mm, and that of strands is preferably 4-12 mm.

FIGS. 1, 2 and 3 illustrate embodiments of cords of twisted metal wires, having the elongation. The cord not only has a sufficiently large vacant space between adjacent metal wires, that is, element filaments, but also has a sufficiently large vacant space between adjacent strands. Therefore, when a vulcanization of a tire is carried out under pressure, cords at the bent corner formed by folding can be prevented from being exposed to an excessively large amount of tension, which is apt to be given to cords at the bent corner formed by folding, and further coating rubber can be easily penetrated into the above described vacant space in the cord during the vulcanization of a tire, and hence the cord can relax the tension caused in the tire by an external force during the running of the tire.

When the number of strands constituting the above described cord of twisted metal wires is 3, the number of metal wires to be twisted around a core filament in a strand must be 4 or 5 in order to attain the object of the present invention.

In a conventional cord disclosed in Japanese Patent Application Publication No. 3,121/78, which has a twisting construction of $3\times(1+6)\times\phi$ illustrated in FIG. 4 attached to the specification of the present application, there is no vacant space between element filaments, and further the number of the filaments in a strand is excessively large and 6, and therefore even when an excessively curved spiral is previously formed in a filament, the vacant space between strands is narrow, and cannot serve to relax the tension caused in the tire and to prevent the breakage of the cord.

On the contrary, when the number of metal wires to be twisted around a core filament in a strand is small and 3, if an excessively curved spiral is formed in the metal wires, strands cannot be twisted uniformly, and cords are locally exposed to an excessively high tension at the bent corner, and are apt to be easily broken.

When the number of strands constituting a cord of twisted metal wires is 4, the number of metal wires to be twisted around a core filament in a strand is limited to 4 based on the same reason as described above.

Figure 6:
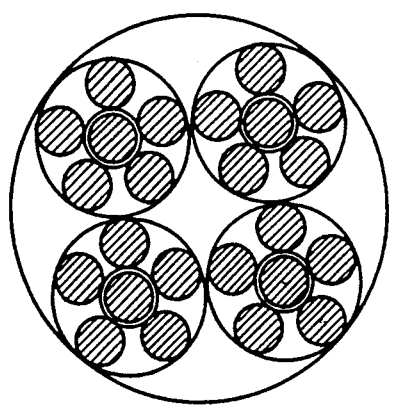

In a cord disclosed in U.S. Pat. No. 3,911,662, which has a twisting construction of $4\times(1+5)\times\phi$ illustrated in FIGS. 5 and 6 attached to the specification of the present application, the vacant space between strands is narrow, and it is impossible to prevent the breakage of cords at the bent corner. Moreover, the cord of this U.S. patent is produced by twisting a plural number of strands in a twisting direction, which is reverse to the twisting direction of filaments. Therefore, although the filaments constituting the cord have a permanent set, the filaments have not substantially been twisted. In a tire which uses cords, each cord consisting of such untwisted or poorly twisted filaments, in a belt to be folded, when an external force acts on the folded portion of the belt due to the rotation of the tire, each filament responses independently to the external force, and the stresses in the filaments are not uniform. As the result, filaments, which have been exposed to an excessively large stress, are first broken, and breakages of the cords occur easily.

That is, in the present invention, it is a first essential requirement that the metal cord in the above described first structural body of a belt has a twisting construction represented by a formula of $n\times(1+m)\times\phi$ which satisfy the following formula $$m = -\frac{1}{2}n^2 + 3n \pm \left(2 - \frac{n}{2}\right)$$

where: $\{n\,|\,n=3,4\}$

Then, an explanation will be made with respect to the elongation of the cord of twisted metal wires of the present invention. When a cord of twisted metal wires has an elongation of less than 0.3% under a load of 5 kg/cord at such a state that the coating rubber is not penetrated into the cord, the cord is difficult to be bent, and the folding processability of a rubberized cord layer containing the cords is very poor in the production of tire, and further the penetration of rubber into the cord is low, resulting in the breakage of the cords. While, when a cord has an elongation of more than 2.5%, the twist of the cord is untwisted during the cutting of the cord at the production of tire, and the handling of the cord becomes difficult. Therefore, the above described elongation must be within the range of 0.3-2.5%.

Further, when the cord of twisted metal wires has an elongation of more than 0.7% under a load of 5 kg/cord after the vulcanization building of a tire, that is, after a coating rubber has been penetrated into the cord, the folded belt cord is elongated at the application of load by an internal pressure and at the rotation of the tire. As the result, the diameter of the tire becomes excessively large, and the high-speed durability of the tire is decreased, and further a large strain is developed in the folded portion E, and the cord is apt to break. Therefore, it is necessary that the cord of twisted metal wires of the present invention has an elongation of not more than 0.7% after vulcanization building of tire.

In the present invention, when n is equal to 3, breakage of filaments in a strand hardly occurs, and the use of a cord formed of 3 strands is more preferable. Of course, in this case, m is 4 or 5.

Radial tires according to the present invention, wherein the above described cords of twisted metal wires are used in the first structural body, will be explained referring to the drawings.

Figure 7:
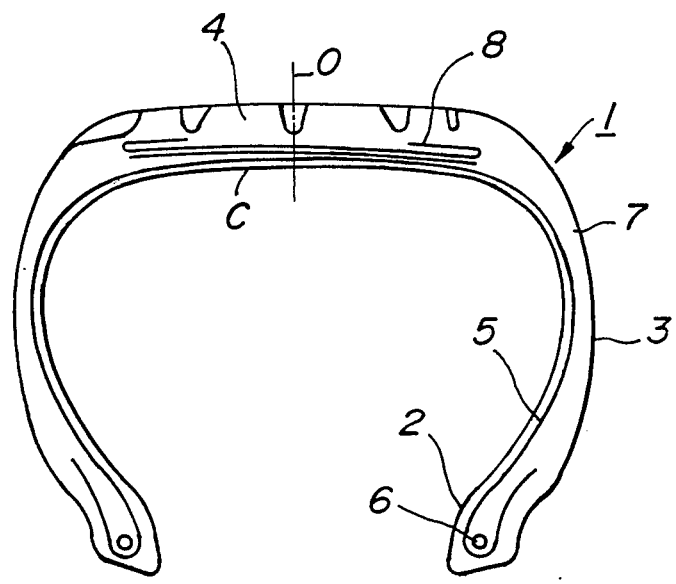
FIG. 7 is a cross-sectional view of a tire illustrating one embodiment of the present invention.
Figure 8:
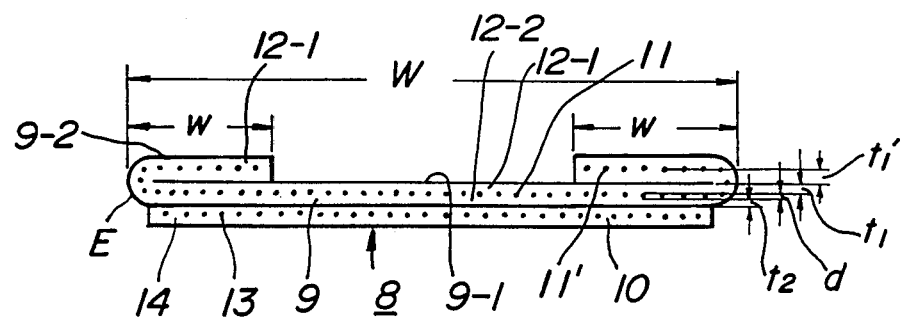
FIG. 8 is a cross-sectional view of a belt used in the tire illustrated in FIG. 7.

FIG. 7 is a cross-sectional view of a tire of the present invention; FIG. 8 is an enlarged cross-sectional view of the belt of the tire illustrated in FIG. 7; and FIG. 9 is a partial plan view of the belt illustrated in FIG. 8.

Referring to FIG. 7, a tire 1 comprises a pair of left and right annular sidewalls 3 having a bead 2 at one end, a tread portion 4 extending between the sidewalls at the end portion opposite to the bead 2 in the radial direction, a carcass 5 arranged extending from one bead 2 to the other bead 2 so as to reinforce both the sidewalls 3 and the tread portion 4, and a belt 8 arranged on the crown portion C of the carcass 5 over the entire width of the tread portion 4 so as to reinforce the crown portion C.

The carcass 5 is composed of at least one rubberized cord ply containing fiber cords, such as nylon, rayon, aromatic polyamide fiber cords and the like, which are arranged at an angle of substantially 90° with respect to the equatorial plane O of the tire, and having turn-up portions surrounding the bead wires 6 at both end portions.

Figure 9:
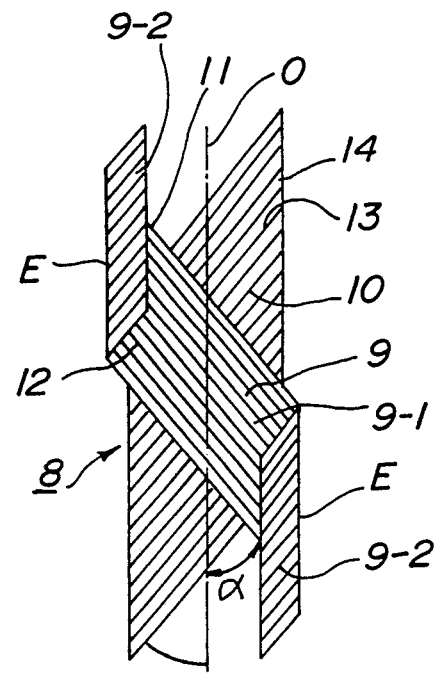
FIG. 9 is a plan view of the essential part of the belt shown in FIG. 7, which illustrates the layer structure of the belt.

Referring to FIGS. 8 and 9, a belt 8 is composed of a first structural body consisting of a rubberized cord layer having a folded portion and a second structural body consisting of a rubberized cord layer having no folded portion, which bodies are superposed one upon another. The first structural body consists of a single rubberized cord layer formed by arranging cords 11 of twisted metal wires at an inclination angle α of 5°–25° with respect to the equatorial plane O of the tire and coating both the surfaces of the cord layer with coating rubbers 12-1 and 12-2. The rubberized cord layer of the first structural body is folded at its both end portions, and is formed of a base portion 9-1 corresponding to the center portion of the layer, and folded portions 9-2 superposed on the base portion 9-1. In the tire illustrated in FIG. 8, the rubber which is present between the cords 11 arranged in the base portion 9-1 and the cords 11' arranged in the folded portion 9-2 consists only of a coating rubber, and the gauge $t_1 + t'_1$ must be 0.5–4.5 times amount, preferably 1.5–3.0 times amount, of the average diameter d of the cords 11 of twisted metal wires in order to attain the object of the present invention. Further, the gauge $t_1$ of the coating rubber 12-1, which coats the cords 11 in the base portion at the bending direction side may be same as the gauge $t_2$ of the coating rubber 12-2, which coats the cords 11 in the base portion at a side opposite to the bending direction, or may be occasionally 2.0–6.0 times amount of the gauge $t_2$ in order to attain the object of the present invention.

As the above described coating rubber, there can be used a rubber having a dynamic modulus of 160–400 kg/cm², preferably 200–300 kg/cm². Further, in the present invention, in addition to the embodiment illustrated in FIG. 8, the first structural body 9 may be constructed such that the gauges of the coating rubbers 12-1 and 12-2 are made into a same gauge of $t_1 = t'_1 = t_2$, and further another rubber sheet having the above described dynamic modulus is inserted between the coating rubbers 12-1 and 12'-1 in the portion corresponding to the width w of the folded portion.

The above described structure of the first structural body 9 can give a proper curvature to the bent portion of the first structural body, can relax properly by the rubber layers 12-1 and 12'-1 the shear stress acting on the region w of the folded portion 9-2, and further can prevent unfavorable decrease of rigidity which is apt to occur in this portion.

The width w of the folded portion 9-2 of the first structural body 9 should be within the range of 17–40% based on the total width W of the first structural body. While, the width of the second structural body 10 should be somewhat smaller than the width W of the first structural body 9.

As the cord 13 of the second structural body 10, use may be made of the same cord of twisted elastic metal wires as that used in the first structural body, and further a cord of twisted ordinary non-elastic metal wires, and an unextendable cord of polyester, rayon, aromatic polyamide or the like. The cord angle β of the cord 13 with respect to the equatorial plane O can be optionally selected within the range of 5°–25° depending upon the purpose. Of course, a coating rubber 14 having a property suitable for the used cords should be selected.

Figure 10:
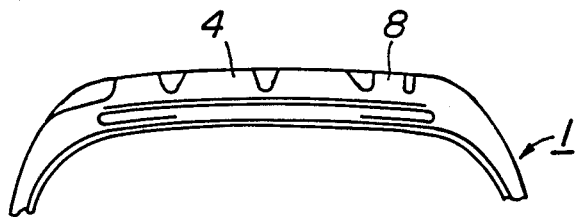
FIGS. 10-14 are cross-sectional views of essential parts of tires, illustrating modifications of the layer structure of the belt.
Figure 11:
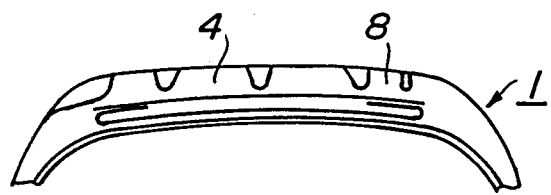
Figure 12:
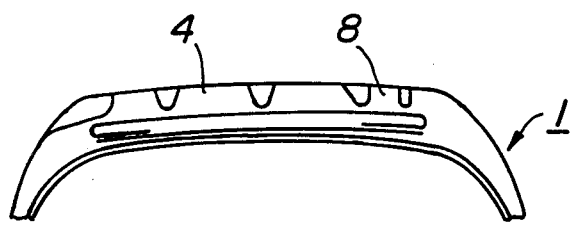
Figure 13:
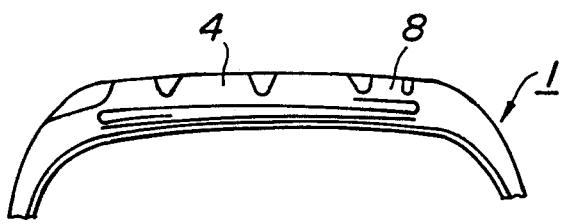
Figure 14:
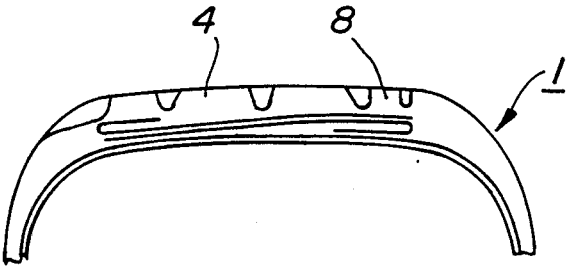

As the structure of the belt relating to the arrangement of the first structural body 9 and the second structural body 10, the following structures can be used in addition to the structure illustrated in FIGS. 7, 8 and 9: a structure wherein the upper and lower portions of the belt illustrated in FIGS. 7, 8 and 9 are wholly arranged in a reverse relation (FIG. 10); a structure wherein a second structural body 10 is closely adhered to and arranged on the folded portion of a first structural body 9 (FIG. 11); a structure wherein the upper and lower portion of the belt 8 illustrated in FIG. 11 are arranged in a reverse relation (FIG. 12); a structure wherein the folding directions at both ends are opposite to each other (FIG. 13); a structure wherein cords of twisted metal wires are used in each of the first and second structural bodies, and both the first and second structural bodies are folded at one end (FIG. 14); and the like. These structures can be properly selected depending upon the use of tire. The present invention includes such modifications of belt structure.

Five kinds of tires according to the present invention having the above described twisting construction in the cord and three kinds of comparative tires, that is, eight kinds of tires in total, which had a tire size of 195/70 VR 14, were produced, and the resistance of the tire against the breakage of cord was examined by a durability test. As the carcass of the test tires, there was used a two-ply carcass consisting of two rubberized cord plies, each containing 1,000 d/2 polyester cords arranged at an angle of 90° with respect to the equatorial plane of the tire.

As the belt of the test tires, there was used a belt having a structure, wherein a first structural body and a second structural body are arranged in a relation illustrated in FIGS. 8 and 9, the width W of the first structural body was 140 mm, and the width w of the folded portion was 45 mm.

The steel cord used in the first structural body is shown in the following Table 1.

TABLE 1

| Used cord | Tire of this invention | | | | | Comparative tire | |
|---|---|---|---|---|---|---|---|
| | No. 1 | No. 2 | No. 3 | No. 4 | No. 5 | No. 6 | No. 7 |
| Twisting construction | 3×(1+5)×0.15 (FIG. 2) | 3×(1+5)×0.20 (FIG. 2) | 3×(1+4)×0.20 (FIG. 1) | 4×(1+4)×0.15 (FIG. 3) | 4×(1+4)×0.20 (FIG. 3) | 3×(1+6)×0.15 (FIG. 4) | 4×(1+5)×0.15 (FIG. 6) |
| Elongation of cord in green state (5 kg/cord) | 1.24 | 2.20 | 2.20 | 1.20 | 1.90 | 1.10 | 1.20 |
| Elongation of cord after vulcanization (5 kg/cord) | 0.27 | 0.15 | 0.35 | 0.40 | 0.30 | 0.39 | 0.65 |
| Twisting[*1] pitch (mm) | 4.0/6.0 | 4.5/6.5 | 4.5/6.5 | 4.0/6.0 | 4.5/6.5 | 4.0/6.0 | 4.0/6.0 |
| Twisting[*2] direction | Z/Z | Z/Z | Z/Z | Z/Z | Z/Z | Z/Z | Z/Z |

[*1,2] Twisting pitch and twisting direction of a cord are shown by the term (A/B), wherein A represents the twisting pitch or twisting direction of filaments constituting a strand and B represents that of strands constituting a cord.

In the second structural body, steel cords, each having a structure of $1\times5\phi'$ ($\phi'$: 0.25 mm), were used.

Both the cord angles represented by $\alpha$ and $\beta$ in FIG. 9 of both the structural bodies were 22°, a rubber blend having a dynamic modulus of 240 kg/cm$^2$ was used, and both the gauges $t_1$ and $t_2$ were 0.305 mm.

The dynamic modulus of the coating rubber was a value measured at room temperature by the following publicly known method, wherein a rubber piece having a length of 25 mm and a width of 5 mm was cut out from a given position of a coating rubber constituting a first structural body, and was formed into a strip-shaped test piece. The test piece was arranged on a high power spectrometer made by Iwamoto Seisakusho under a condition of 5% elongation, and vibrated at room temperature under a frequency of 50 Hz and a dynamic strain of 1%.

Each of the eight kinds of tires was mounted on a standard rim, inflated under an internal pressure of 1.9 kg/cm$^2$, and subjected to a running test, wherein the tire was continuously run for five days on a drum under a load of 570 kg/cm$^2$ at a speed of 50 km/hr and at a slip angle of 8°.

After completion of the running test, all the tires were cut, and the broken state of the cord in the belt was examined. In all the comparative tires of Nos. 6 and 7, cords were broken off and on along the circumference of the tire at their bent portion of the first structural body of the belt. In the comparative tire of No. 6, there is no vacant space between element filaments, and further the number of the filaments in a strand is excessively large and 6, and therefore even when an excessively curved spiral is previously formed in a filament, the vacant space between strands is narrow, and cannot serve to relax the tension caused in the tire and to prevent the breakage of the cord. In the comparative tire of No. 7, wherein a twisting construction of $4\times(1+5)\times\phi$ is used, the vacant space between the strands is small, and the cords are always broken. On the contrary, in any of the tires of Nos. 1-5 according to the present invention, breakage of cord did not occur.

Further, each of the eight kinds of tires was mounted on a standard rim, inflated under an internal pressure of a 1.9 kg/cm$^2$, fitted to front wheels of a rear wheel-drive passenger car, and subjected to a running test, wherein the car was run by 20,000 km on mountain paths and sloping roads having a large number of sharp curves. In the test, the comparative tire of No. 7 was used as a standard tire and compared with sample tires, and further the test was carried out such that influences due to the difference between the fitted positions of tire and to the difference between the test cars do not appear.

After the running, 200 steel cords used in the belt were sampled from each tire, and the breakage of the cords was examined. As the result, it was found that, in the tires of Nos. 1, 2, 3, 4 and 5 according to the present invention, none of the cords were broken. On the contrary, in the comparative tire of No. 6, about 90% of the cords were broken; in the comparative tire of No. 7, about 70% of the cords were broken; and in the comparative tire of No. 8, about 80% of the cords were broken.

In the tire of Nos. 1, 2, 3, 4 and 5 according to the present invention, the breakage of filaments in the cord was further examined. As the result, it was found that, in the tires of Nos. 1, 2 and 3, the breakage of filaments in the cord was only less than 2%, but in the tire of No. 4, the breakage of filaments was 11%, and in the tire of No. 5, the breakage of filaments was 16%.

As described above the radial tire according to the present invention has a high resistance against the breakage of cords at the bent corner of the first structural body without the use of an auxiliary layer or relaxation layer. Therefore, the radial tire has excellent cornering stability and high-speed durability, and is very valuable for practical use.

What is claimed is:

1. In a radial tire having an improved durability, comprising a carcass composed of at least one rubberized cord ply, and a belt superimposed about a crown portion of the carcass and composed of a first structural body and a second structural body; said first structural body having widthwise ends and a base portion corresponding to a center portion, said first structural body consisting of a single rubberized cord layer containing cords of twisted metal wires arranged at an inclination angle of 5°-25° with respect to the equatorial plane of the tire and embedded in a coating rubber; and said second structural body consisting of at least one rubberized cord layer containing unextendable cords arranged at an inclination angle with respect to the above described equatorial plane in a direction of a crossing with the cords in said base portion of the first structural body and embedded in a coating rubber; and at least the first structural body being folded along at least one of the widthwise ends to form at least folded portions such that any folded portions are superposed on the base portion of the first structural body; an improvement comprising; the cord of twisted metal wires used in the structural body, which has the folded portion(s) at the widthwise end(s), having a twisting construction represented by the following formula (1)

$$n \times (1+m) \times \phi \quad (1)$$

wherein m is the number of metal wires in a strand surrounding a core, n is the number of strands used, and $\phi$ is a diameter of the metal wire, which satisfies a relation represented by the following formula (2)

$$m = -\frac{1}{2} n^2 + 3n \pm \left(2 - \frac{n}{2}\right) \quad (2)$$

where: $\{n | n = 3, 4\}$, and the cord consisting of a plural number of strands twisted together, each strand consisting of previously spirally curved metal wires twisted together, the twisting direction of the cord being the same as that of the strands, the twisting pitch of said metal wires in the range of 2–8 mm and the twisting pitch of said strands in the range of 4–12 mm; and further the elongation of the cord under a load of 5 kg/cord being 0.3–2.5% at such a state that the coating rubber is not penetrated into the cord, and being not more than 0.7% after the vulcanization of the tire.

2. A radial tire according to claim 1, wherein n is 3.

3. A radial tire according to claim 1, wherein the diameter of the metal wire is between 0.15 mm and 0.23 mm.

* * * * *